(12) United States Patent
Chiang (10) Patent No.: US 8,222,341 B2
(45) Date of Patent: Jul. 17, 2012

(54) SEMI-CONDUCTIVE SILICONE POLYMERS (75) Inventor: Albert C. Chiang, Ledyard, CT (US)

(73) Assignee: Mearthane Products Corporation, Cranston, RI (US)

( * ) Notice: Subject to any disclaimer, the term of this patent is extended or adjusted under 35 U.S.C. 154(b) by 521 days.

(21) Appl. No.: 12/405,706

(22) Filed: Mar. 17, 2009

(65) Prior Publication Data

US 2010/0236897 A1 Sep. 23, 2010

(51) Int. Cl.
*C08L 83/04* (2006.01)

(52) U.S. Cl. ........ 524/588; 524/140; 524/144; 524/145; 524/417

(58) Field of Classification Search .................. None
See application file for complete search history.

(56) References Cited

U.S. PATENT DOCUMENTS

| | | |
|---|---|---|
| 3,171,819 A | 3/1965 | Powanda |
| 3,293,728 A | 12/1966 | Hill |
| 3,725,308 A | 4/1973 | Ostolski |
| 3,959,573 A | 5/1976 | Eddy et al. |
| 4,130,708 A | 12/1978 | Friedlander et al. |
| 4,196,268 A | 4/1980 | Brown et al. |
| 4,231,901 A | 11/1980 | Berbeco |
| 4,257,699 A | 3/1981 | Lentz |
| 4,296,172 A | 10/1981 | Hill |
| 4,350,777 A | 9/1982 | Henrichs et al. |
| 4,393,179 A | 7/1983 | Hoppe et al. |
| 4,395,497 A | 7/1983 | Naarmann et al. |
| 4,397,974 A | 8/1983 | Goyert et al. |
| 4,435,490 A | 3/1984 | Lelental et al. |
| 4,448,919 A * | 5/1984 | Murase .................. 524/394 |
| 4,568,485 A | 2/1986 | Jonas et al. |
| 4,581,158 A | 4/1986 | Lin |
| 4,617,325 A | 10/1986 | Knobel et al. |
| 4,618,630 A | 10/1986 | Knobel et al. |
| 4,622,361 A | 11/1986 | Gill et al. |
| 4,652,399 A | 3/1987 | Herweh |
| 4,654,279 A | 3/1987 | Bauer et al. |
| 4,655,966 A | 4/1987 | Guillaumon et al. |
| 4,684,538 A | 8/1987 | Klemarczyk |
| 4,710,015 A | 12/1987 | Takeda et al. |
| 4,728,690 A | 3/1988 | Lammerting et al. |
| 4,747,966 A | 5/1988 | Maeno et al. |
| 4,762,899 A | 8/1988 | Shikinami |
| 4,798,851 A | 1/1989 | Werner et al. |
| 4,806,571 A | 2/1989 | Knobel et al. |
| 4,857,623 A | 8/1989 | Emmerling et al. |
| 4,886,626 A | 12/1989 | Cope et al. |
| 4,916,199 A | 4/1990 | Bandlish et al. |
| 4,962,178 A | 10/1990 | Harisiades |
| 4,978,705 A | 12/1990 | Lamont |
| 5,011,739 A | 4/1991 | Nielsen et al. |
| 5,064,574 A | 11/1991 | Oldham et al. |
| 5,077,330 A | 12/1991 | Ehrhart et al. |
| 5,110,669 A | 5/1992 | Knobel et al. |
| 5,120,812 A | 6/1992 | O'Lenick et al. |
| 5,156,915 A | 10/1992 | Wilson et al. |
| 5,212,032 A | 5/1993 | Wilson et al. |
| 5,217,838 A | 6/1993 | Wilson et al. |
| 5,221,724 A | 6/1993 | Li et al. |
| 5,238,969 A | 8/1993 | Guarneri et al. |
| 5,247,001 A | 9/1993 | Lacour |
| 5,248,560 A | 9/1993 | Baker et al. |
| 5,250,357 A | 10/1993 | Wilson et al. |
| 5,252,683 A | 10/1993 | Murata et al. |
| 5,284,600 A | 2/1994 | Hilti et al. |
| 5,326,845 A | 7/1994 | Linden |
| 5,330,840 A | 7/1994 | Chen et al. |
| 5,348,762 A | 9/1994 | Hofherr et al. |
| 5,354,641 A | 10/1994 | Lima |
| 5,387,627 A | 2/1995 | Hilti et al. |
| 5,426,158 A | 6/1995 | Mueller et al. |
| 5,430,533 A | 7/1995 | Dreyfuss et al. |
| 5,432,246 A | 7/1995 | Fenn et al. |
| 5,434,653 A | 7/1995 | Takizawa et al. |
| 5,504,217 A | 4/1996 | Hilti et al. |
| 5,525,654 A | 6/1996 | Podola et al. |
| 5,554,709 A | 9/1996 | Emmerling et al. |
| 5,574,122 A | 11/1996 | Yeske et al. |
| 5,750,630 A | 5/1998 | Sengupta |
| 5,760,155 A | 6/1998 | Mowrer et al. |
| 5,786,091 A | 7/1998 | Kurokawa et al. |
| 5,810,705 A | 9/1998 | Mimura et al. |
| 5,830,541 A | 11/1998 | Carswell et al. |
| 5,834,116 A | 11/1998 | Sawa et al. |
| 5,851,657 A | 12/1998 | Yasuno et al. |
| 5,874,172 A | 2/1999 | Beach et al. |
| 5,893,821 A | 4/1999 | Ando et al. |
| 5,933,693 A | 8/1999 | Sakata et al. |
| 5,968,656 A | 10/1999 | Ezenyilimba et al. |
| 5,993,366 A | 11/1999 | Kaji et al. |
| 6,042,946 A | 3/2000 | Massie et al. |
| 6,063,499 A | 5/2000 | Chiang et al. |
| 6,067,434 A | 5/2000 | Takagi et al. |
| 6,074,756 A | 6/2000 | Vreeland et al. |
| 6,087,011 A | 7/2000 | Beach et al. |
| 6,117,557 A | 9/2000 | Massie et al. |
| 6,270,449 B1 | 8/2001 | Hirayama |
| 6,339,124 B1 | 1/2002 | Igarashi et al. |

(Continued)

FOREIGN PATENT DOCUMENTS

DE 2845674 5/1980

(Continued)

OTHER PUBLICATIONS

Machine translation of JP 2003-082232 (Mar. 2003) into English.*

(Continued)

*Primary Examiner* — Marc Zimmer
(74) *Attorney, Agent, or Firm* — Fish & Richardson P.C.

(57) ABSTRACT

Semi-conductive silicone compositions and articles of manufacture containing these compositions are formed by combining a silicone precursor composition with an alkali metal salt and polymerizing the silicone precursor composition in the presence of the alkali metal salt to form a polymerized semi-conductive silicone composition. The polymerized silicone composition can be formed into a solid or foam article of manufacture having a volume resistivity of E8 to E12 ohm-cm, such as a roller or an anti-static belt.

14 Claims, 2 Drawing Sheets

U.S. PATENT DOCUMENTS

| | | | |
|---|---|---|---|
| 6,458,063 | B2 | 10/2002 | Kodama |
| 7,184,695 | B2 * | 2/2007 | Furuya .................. 399/313 |
| 2002/0111419 | A1 | 8/2002 | Chiang et al. |
| 2008/0076864 | A1 | 3/2008 | Mogi |

FOREIGN PATENT DOCUMENTS

| | | |
|---|---|---|
| EP | 0122633 A1 | 10/1984 |
| EP | 0521826 | 1/1993 |
| JP | 4997845 | 9/1974 |
| JP | 4997846 | 9/1974 |
| JP | 4997847 | 9/1974 |
| JP | 5730319 | 2/1982 |
| JP | 6025159 | 2/1985 |
| JP | 60189229 | 9/1985 |
| JP | 61264053 | 11/1986 |
| JP | 62256990 | 11/1987 |
| JP | 1109663 | 4/1989 |
| JP | 2166158 | 6/1990 |
| JP | 6348561 | 12/1994 |
| JP | 08333433 | 12/1996 |
| JP | 2003082232 A | 3/2003 |
| JP | 2006-225422 A * | 8/2006 |
| JP | 2000186129 | 7/2007 |
| TW | 205038 | 5/1993 |

OTHER PUBLICATIONS

Abstract for JP 2006-225422 A.*
International Search Report and Written Opinion for Application No. PCTUS2010027581 dated Sep. 17, 2010, 19 pages.
Database WPI Week 200364, Thomson Scientific, London, GB, 4 pages.
Brunner, "Leitklebstoffe: Die sinnvolle Alternative", Adhaesion, 1987, 31(10), pp. 9-10, 13-13 (Ger), 3 pages.
Chiang, "Synthesis and Electrical Conductivity Measurement of Polyphenylacetylene and Its Derivatives", 1980, 188 pages.
Jasiulek et al., "Stromleitende Klebstoffe-Verlaf der Elektrizitatsleitung", Adhaesion, 1980 24(4), pp. 94-99 (Ger).
Yoneyama et al., Kogyo Zairyo, 1983, 31(11), pp. 101-106 (Japan).
Killis et al., "Ionic Conductivity of Polyether-Polyurethane Networks Containing Alkali Metal Salts. An Analysis of the Concentration Effect", (Abstract) CA100(6):35112y (1984), 12 pages.
USPTO Non-Final Office Action in U.S. Appl. No. 10/274,631, mailed Jun. 8, 2005, 10 pages.

* cited by examiner

SEMI-CONDUCTIVE SILICONE POLYMERS

TECHNICAL FIELD

This disclosure relates to semi-conductive silicone polymer compositions comprising an alkali metal, and to products formed of such polymers.

BACKGROUND

Silicone polymers are useful, for example, in making various articles of manufacture, such as rollers or tubes used in office machines (e.g., thermal printers, mailing machines, fax machines, copiers, laser printers, and offset printers). Silicone polymers for these applications can be made of non-conductive silicone polymers that are thermal and electrical insulators. However, these silicone polymer surfaces can be slippery (e.g., have a low tackiness) and can have a volume resistivity of about $10^{13}$ to $10^{15}$ (i.e., "E13-E15") ohm-cm. Such "non-conductive" roller devices can accumulate tribocharge when they are moving against paper, especially in cold low humidity. In use for printer applications, such non-conductive roller surfaces can result in paper jams, absent a means for dissipating the charge from the rollers (e.g., by using a conductive brush). This problem can be reduced by modifying the silicone polymer roller composition to provide a semi-conductive silicone roller having a volume resistivity in the range of E8-E11 ohm-cm. For example, conductive additives such as metal powders or carbon black can be added into silicone polymers in an amount that is as high as 800% by weight of the silicone polymers to enhance the conductivity of silicone polymer roller surfaces.

SUMMARY

The invention provides processes for producing semi-conductive silicone compositions and articles of manufacture containing these compositions. Generally, the semi-conductive silicone compositions are electrically semi-conductive materials formed by combining a silicone precursor composition with an alkali metal salt and polymerizing the silicone precursor composition in the presence of the alkali metal salt to form the semi-conductive silicone composition.

For example, a solution of an alkali metal salt in a phosphate-containing flame retardant material (e.g., containing about 10% wt alkali metal salt in a flame retardant solvent) can be combined with a first reactive silicone precursor (e.g., 0.5 pph to about 5 pph of the first reactive silicone precursor) to form a precursor dispersion. The precursor dispersion can be heated (for example) to about 90-250° F. The precursor dispersion can be combined with a second reactive silicone precursor to form a reactive silicone precursor composition, which can further comprise a catalyst and a cross-linking agent. The reactive silicone precursor composition can include a first silicone precursor of formula (I) having a first reactive moiety X and a second silicone precursor of formula (II) having a second reactive moiety Y:

(I)

(II)

wherein A, B and Z are independently electron donating atoms (e.g., oxygen, nitrogen phosphorus or sulfur) or chemical groups; $R_1$, $R_2$ and $R_3$ are independently selected from the group consisting of: hydrogen, alkyl, haloalkyl, alkoxyl, and aryl; and X and Y are independently selected to react to form from the silicone polymer. X and Y can be independently selected from the group consisting of: hydrogen, hydroxyl, ester, ether, and chemical moieties including an unsaturated bond to a carbon, oxygen, sulfur, phosphorus or a nitrogen atom, such that X and Y are selected to react during polymerization of the reactive silicone precursor composition. The reactive silicone precursor composition preferably include one or more siloxane derivatives. The reactive silicone precursor composition can include the alkali metal salt in an amount of up to about 5.0% (e.g., about $5.0 \times 10^{-4}$% to 5.0%) by weight of the reactive silicone precursor composition.

The silicone precursors in the reactive silicone precursor composition can be polymerized to form a polymerized silicone composition. The polymerized silicone composition can contain a polymer including silicon atoms chemically bound to electron-donating atoms, such as oxygen, forming a chemical coordination complex with an ionic portion of the alkali metal salt. The polymerized silicone composition can be a flowable composition (e.g., having a viscosity of less than about 200,000 cps) that can be formed into an article of manufacture having a volume resistivity of E8 to E12 ohm-cm (i.e., $1 \times 10^8$ to $1 \times 10^{12}$ ohm-cm), such as a roller (e.g., by casting) or an anti-static belt.

The polymerized silicone composition can be formed into an article of manufacture, for example by casting processes. The article of manufacture can be, for example, a roller or belt and can include the polymerized composition as a solid or foam. The polymerized silicone composition can be molded to form a surface of a printer roller, an antistatic roller, a toner fuser roller, an offset printing relief roller for offset printing or an antistatic belt. In one particular example, the article of manufacture is a material conveyor that includes a mount enabling relative motion of a conveyor with respect to adjacent structure and an exposed conveyor surface connected to the mount and formed of a semi-conductive silicone composition including a silicone polymer and about $5.0 \times 10^{-4}$% to 5.0% by weight of an alkali metal salt and having a volume resistivity of E8 to E12 ohm-cm. The material conveyor can be in the form of a cylindrical roll, with the mount being configured to enable rotation of the roll about a longitudinal axis, and the exposed surface being a cylindrical outer surface of the roll. The material conveyor can also be in the form of an articulable or flexible belt, where the mount includes an engageable undersurface or drive lugs of the belt, and wherein the exposed surface comprises an outer surface of the belt.

DETAILED DESCRIPTION

Semi-conductive silicone compositions are formed by (a) combining an alkali metal salt with a silicone precursor composition and (b) polymerizing the reactive silicone precursor composition in the presence of the alkali metal salt to form a semi-conductive silicone composition. The silicone precursor composition can include a silicon atom (Si) bound to one or more electron donating groups, such as sulfur, nitrogen or oxygen (e.g., a siloxane), and the semi-conductive silicone composition can include a chemical complex of a portion of the alkali metal salt with one or more of the electron donating atoms.

The alkali metal salt can be selected to form the semi-conductive silicone composition. For example, the alkali metal salt can include a cationic species selected from the group consisting of lithium, sodium, and potassium with an anionic species, such as an anion selected from the group consisting of nitrate, sulfate, perchloride, chlorate, perbromate, bromate, periodate, iodate, chloride, bromide, and iodide. Specific examples of alkali metal salts include: lithium perchlorate, potassium perchlorate, sodium perchlorate, lithium perbromate, sodium perbromdate, potassium perbromate, lithium periodate, sodium periodate, potassium periodate, lithium chlorate, sodium chlorate, potassium chlorate, lithium bromate, sodium bromate, potassium bromate, lithium chloride, sodium chloride, potassium chloride, lithium bromide, sodium bromide and potassium bromide, lithium iodide, sodium iodide, potassium iodide, lithium nitrate, sodium nitrate, potassium nitrate, lithium sulfate, sodium sulfate and potassium sulfate.

The alkali metal salt can be combined with a silicone precursor composition as a solution. The solution can be a homogenous solution of the alkali metal salt in a solvent. The solution can be formed by dissolving an alkali metal salt directly in a silicone precursor composition and/or dissolving the alkali metal salt in a solvent prior to, during and/or after combination of the solution with the silicone precursor composition. When present, the solvent can be selected to dissolve the alkali metal salt, for example by solvating a cation and anion species of the alkali metal salt. For example, the alkaline metal salts can be dissolved in flame-retardants, polyols, alcohols, solvents, or precursors having a pH values between 1 and 7 (e.g., 3-5), at a low concentration (e.g., 5-35% of a solution). The flame retardants include compounds such as tri(B-chloroethyl)phosphate (CEP) or YCEF, tri(B-chloropropyl)phosphate (CPP) or YPCF, and tributylethyl phosphate (T-BEP), or tributoxyethyl phosphate (KP-140) (e.g., from Great Lakes, West Lafayette, N.Y.). The amount of the alkali metal salt in the solution can be selected to provide a semi-conductive silicone polymer having a desired resistivity. For forming semi-conductive silicone polymers with a volume resistivity of E8 to E12 ohm-cm, an alkali metal salt solution can be present in the solution at a concentration of 0.01% to 20% (e.g., about 10%) by weight. For instance, CA-301, which is prepared by dissolving 10 grams of lithium perchlorate in 90 grams of Fyrol tri(B-chlorethyl)phosphate (available from Akzo Chemical Inc. (Chicago, Ill.)) at 200° F. under mixing at 300 rpm for 2 hrs and can be obtained from Mearthane Products Co. (Cranston, R.I.); CA-701, which can be prepared by dissolving 10 grams of lithium perchlorate in 90 grams of Phosflex T-BEP or KP-140, tributoxyethyl phosphate (available from Akzo Chemical Inc.) at 200° F. under mixing at 300 rpm for 2 hrs and also can be obtained from Mearthane Products Co.; CA1301, which can be prepared by dissolving 10 grams of lithium perchlorate in 90 grams of Fyrol PCF, tri(B-chloropropyl)phosphate, (available from Akzo Chemical Inc.) at 200° F. under mixing at 300 rpm for 2 hrs and can be obtained from Mearthane Products Co.; and R-2370 Part A and Part B, which can be obtained from NuSil Silicone Technology (Carpinteria, Calif.).

The silicone precursor composition contains one or more reactive silicone precursor molecules. The term "reactive silicone precursors" refers to silicon-containing monomers, macromonomers and/or polymers that can undergo polymerization to form a silicone polymer (e.g., by addition polymerization or condensation polymerization). The reactive silicone precursors can be selected to form a silicone polymer with a volume resistivity of E13-E15 ohm-cm in the absence of the alkali metal salt. The reactive silicone precursor can be selected to form a silicone polymer that forms a coordination complex with the cationic portion of the alkali metal salt. For example, the reactive silicone precursors can include an electron donating portion that forms a coordination ligand with a metal portion of the alkali metal salt in the silicone polymer. The electron donating portion of the reactive silicone precursor can be selected from the group consisting of oxygen, nitrogen and sulfur atoms chemically bound to a silicon atom. The amount of the alkali metal salt, or alkali metal salt solution in the reactive silicone precursor composition can be selected to provide the alkali metal salt in an amount of up to about 5.0% (e.g., about $5.0 \times 10^{-4}$% to 5.0%) by weight of the reactive silicone precursor composition. The alkali metal salt solution can be heated in the solvent to about 90-250° F. prior to, while and/or after combination with a first reactive silicone precursor molecule. For example, the silicone precursor composition can include about 0.5 pph to about 5 pph (part per hundred) of one or more reactive silicone precursor composition(s) combined with a 10% alkali metal salt solution to achieve a solid or foam polymerized silicone composition with E8-E10 ohm-cm volume resistivity for antistatic and other charge management applications.

The reactive silicone precursor composition can include multiple reactive molecules, such as reactive monomers and/or polymer molecules. In one example, the reactive silicone precursor composition includes a first silicone precursor of formula (I) having a first reactive moiety X and a second silicone precursor of formula (II) having a second reactive moiety Y:

wherein A, B and Z are independently electron donating atoms (e.g., oxygen, nitrogen or sulfur) or chemical groups; $R_1$, $R_2$ and $R_3$ are independently selected from the group consisting of: hydrogen, alkyl, haloalkyl, alkoxyl, and aryl; and X and Y are independently selected to react to form from the silicone polymer. For example, X and Y can be independently selected from the group consisting of: hydrogen, hydroxyl, ester, ether, and chemical moieties including an unsaturated bond to a carbon, oxygen, sulfur or a nitrogen atom, such that X and Y are selected to react during polymerization of the reactive silicone precursor composition. The reactive silicone precursor composition preferably include one or more siloxane derivatives.

The reactive silicone precursor is polymerized in the presence of the alkali metal salt to form a polymerized silicone composition. Polymerization can be performed by combining a precursor dispersion of the alkali metal salt solution with the first reactive silicone precursor of formula (I) with a second reactive silicone precursor of formula (II) under conditions effective to react groups X and Y to chemically bind the first reactive silicone precursor to the second reactive silicone precursor, forming a polymerized silicone composition. The polymerized silicone composition preferably includes a chemical coordination complex of a portion of the alkali metal salt with one or more electron donating atoms of the polymerized silicone composition.

In one example, the first silicone precursor and the second silicone precursor are selected to react by addition polymerization. A, B and Z in formulae (I) and (II) can be oxygen, X in formula (I) can be an ethylenyl vinyl moiety, and Y in formula (II) can be hydrogen. $R_1$, $R_2$ and $R_3$ are defined above for formulae (I) and (II). Accordingly, the polymerization of the reactive silicone precursors can be performed according to the reaction scheme I below:

Scheme I: Additional Polymerization

In reaction scheme I, the first reactive silicone precursor (A) has a structure according to formula (I) where Z is oxygen, X is a vinyl ethylene moiety and $R_1$ and $R_2$ are independently selected from the groups hydrogen, alkyl, haloalkyl, alkoxyl, and aryl. The second reactive silicone precursor (B) in reaction scheme I has a structure according to formula (II) where A and B are oxygen, Y is hydrogen and $R_3$ is selected from the groups hydrogen, alkyl, alkoxyl, haloalkyl, and aryl. The polymerization can be performed in the presence of a platinum catalyst to produce a polymerized silicone composition (AB)' shown in scheme I. In other variations of reaction scheme I, A, B and Z are independently atoms selected from the group consisting of: oxygen, sulfur and nitrogen; and X includes a vinyl end group and Y is hydrogen, or Y includes a vinyl end group and X is a hydrogen moiety. Examples of reactive silicone precursors with a vinyl end group include divinyl- or vinyl-diorgano radical endblock polydiorganosiloxane, in which each organic group is alkyl, haloalkyl, phenyl, platinum-containing catalyst, or polyorganohydrogensiloxane.

In another example, the first silicone precursor and the second silicone precursor are selected to react by condensation polymerization. Z in formula (I) can be oxygen, X in formula (I) can be hydroxyl (—OH), A and B in formula (II) can be independently —$OR_4$ and —$OR_5$ moieties, respectively, and Y in formula (II) can be —$OR_6$. In formula (II), $R_4$, $R_5$ and $R_6$ can be the same or different and are independently selected from the group consisting of: alkyl (e.g., ethyl, propyl, or butyl), alkoxyl, aryl (e.g., benzene or naphthalene), haloalkyl (e.g., bromomethyl), alkylcarbonyl (e.g., ethylcarbonyl), heteroaryl (e.g., furyl), and arylcarbonyl (e.g., phenylcarbonyl, naphthalenylcarbonyl).

Scheme II: Condensation Polymerization

In reaction scheme II, the first reactive silicone precursor (A') has a structure according to formula (I) where Z is oxygen, X is a hydroxyl moiety and $R_1$ and $R_2$ are independently selected from the groups hydrogen, alkyl, alkyloxy, haloalkyl, and aryl. The second reactive silicone precursor (B') in reaction scheme II has a structure according to formula (II) where A and B in formula (II) are independently —$OR_4$ and —$OR_5$ moieties, respectively, and Y in formula (II) is —$OR_6$, as defined above. The polymerization can be performed in the presence of a tin catalyst to produce a polymerized silicone composition (A'B')'' shown in scheme II. In other variations of reaction scheme II, A, B and Z are independently atoms selected from the group consisting of: oxygen, sulfur and nitrogen; and X includes an ester or ether end group and Y is hydroxyl, or Y includes an ester or ether group and X is hydroxyl moiety.

Specific examples of the silicone polymer precursors include Immix silicone EX1471 part A' and part B', and Immix Silicone EX 1472 part A' and part B', which can be obtained from Immix Technologies LLC (Biddeford, Me.); Silastic J, RTV part A' and part B', and Silastic E, RTV part A' and part B', both of which can be obtained from Dow Corning Corporation (Midland, Mich.); GE Silcone RTV T-2 part A and part B, and GE Silicone RTV 128, part A' and part B', both of which can be obtained from General Electric Co. (Waterford, N.Y.); and Polycast 898, part A and part B, and Polycast RTV 740, part A' and part B', both of which can be obtained from Polycast Industries (North Bayshore, N.Y.,); and R2370, base (Part A') and R2730, curing agent (Part B'), which can be obtained from NuSil Silicone Technology (Carpinteria, Calif.).

The alkali metal salt solution, the precursor dispersion, the reactive silicone precursor composition and/or the polymerized silicone composition can have less than 10% (e.g., less than 5%, less than 1%, less than 0.1%, or be free of) conductive particles such as carbon black, metallic powders, vacuum coated metalized fiber, and inorganic powder particles.

In other examples, one or more alkali metal salts can be added into the precursor dispersion, the reactive silicone precursor composition and/or the polymerized silicone composition prior to curing the polymerized silicone composition.

The polymerized silicone composition can be a flowable liquid composition that can be formed into an article of manufacture, or portion thereof. Preferably, the polymerized silicone composition is a liquid having a viscosity of up to about 200,000 centipoise (e.g., a viscosity of 10-200,000 cps). The liquid polymerized silicone composition can be suitable for casting into the article of manufacture. The polymerized silicone composition can be poured into a mold and molded in the mold to form a molded composition.

After molding, the polymerized silicone composition can be de-molded. De-molding can be performed using a mold release agent and an adhesive. Examples of de-molding agents include Stoner Dry film mold release, E-408, from Stoner Co. (Quarryville, Pa.), W-097 from Dimond Kote (Cincinnati, Ohio), or Vasoline from Chesebrough-Ponds USA (Greenwich, Conn.); and examples of adhesives include (e.g., Chemlok 206 and Chemlok 207 from Lord Corporation, P-5200 from Dow Chemical (Midland, Mich.), and GE RTV 128 from General Electric Co. (Waterford, N.Y.).

The de-molded article can be cured. Curing of the demolded pieces can be further accelerated by leaving in an oven at about 25-400° F. (e.g., 120 to 350° F.) for 30 minutes to 12 hours. Preferably, the cured polymerized silicone composition has an alkaline metal salt evenly (e.g., uniformly, homogeneously) distributed within the silicone polymer, and can be formed into an article of manufacture with a volume resistivity of E8 to E12 ohm-cm (while having less than 10% conductive particles such as carbon black). In one example, the durometers ranges from 30 Shore A to 60 Shore A for solid silicone and 5A to 40A for conductive silicone foams. In another example, both solid and foam silicones can have a hardness of 3-75 Shore A. These conductive levels are sufficient for both antistatic and ESD (electrostatic dissipation) applications.

After de-molding and curing, the cured silicone polymer can be ground to a specified dimension and surface characteristic (e.g., length, outer diameter, surface smooth, crown, concentricity, hardness, compress set, tensile strength, tear strength, elongation, abrasion, surface energy and coefficient of friction) and then fabricated with a machine. Other types of application include components in the form of tube, belt, sheet, rod and wheel in either foam or solid for office machines. The article of manufacture can be have various forms, including a foam or solid silicone material. The portion of the article of manufacture, or component thereof, including the semi-conductive silicone polymer and salt composition preferably includes at least 75%, more preferably 85%, and most preferably 95%, of the silicone polymer by weight.

In another example, a polymerized silicone composition can be formed by first mixing a first precursor (e.g., Part A) with a conductive additive (e.g., a 10% wt alkali metal flame retardant solution) and then heating the reactive silicone precursor composition to a specified temperature (e.g., 90° F. to 250° F.). Into the reactive silicone precursor composition is then added second precursor (e.g., Part B) which contains a catalyst and cross-linking agent. Examples of cross-linking agents include polydiamine and polydiol, or diamine and diols. One or both of the precursor compositions can be formulated to act as a cross-linking agent, for example by including moieties that form cross-links during polymerization. After mixing the first and second precursors (e.g., Part A and Part B) for 0.2 to 3 minutes under conditions effective to polymerize the reactive silicone precursor composition, the resulting polymerized silicone composition is poured into a mold. The mixture is then de-molded after 5-40 minutes and left at room temperature for continuous curing.

The polymerized silicone composition can be formed into semi-conductive components (e.g., rollers, belts) for use in various products (e.g., thermal printers, laser printers, copier, and offset printers). In office machines, such as fax machine or thermal printing, the semi-conductive polymers can be used for bar coding and packaging printing on thermal paper or adhesive label. Other applications for the semi-conductive silicone polymer compositions can include components for use in offset printing or release printing (e.g., components for drum to transfer imaging from drum to the paper for the release). The article of manufacture can be, for example, a roller (e.g., a printer roller, an antistatic roller, a conductive roller such as paper transfer roller, offset roller, developer roller and fuser roller), an antistatic belt, or other components in office machines for charge management, anti-static application or electrostatic discharge applications (e.g., for paper transport, fuser roller for imaging fixing, or release character for offset printing). The polymerized composition can be a solid or foam composition molded to form a surface of a printer roller, an antistatic roller, a toner fuser roller, an offset printing relief roller for offset printing or an antistatic belt. The semi-conductive silicone polymers described herein also can be made into rods, sheets, tubes, or other top coating materials that can be used (for example) in the thermal direct, thermal transfer printer due to their temperature resistive properties.

Figure 1:
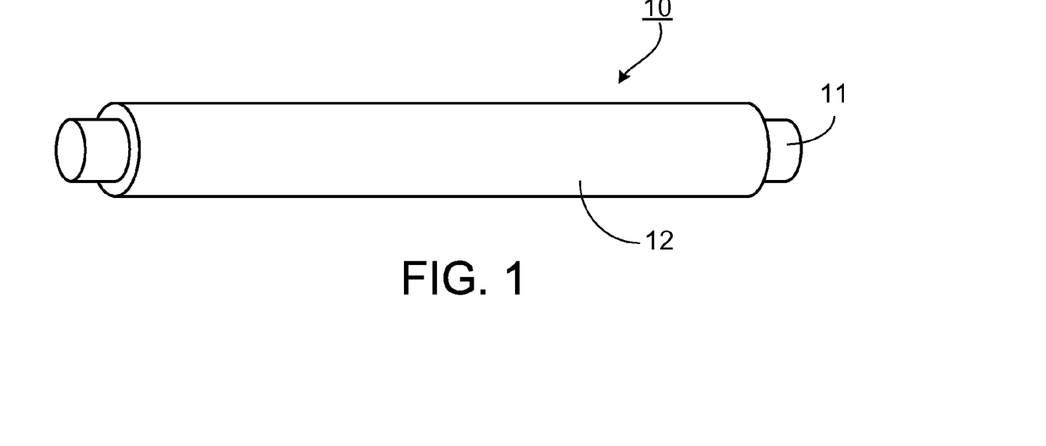
FIG. 1 shows a semi-conductive roller comprising a silicone polymer.

In one example, shown in FIG. 1, the article of manufacture is a semi-conductive roller to be used as antistatic roller for paper and article handling to eliminate the tribocharge buildup during the paper or article transport. The semi-conductive silicone roller, 10, including a shaft 11 surrounded by a single layer 12 of semi-conductive silicone polymer with at least one alkaline metal salt, which is substantially evenly distributed in the silicone polymer. The outer surface of the roller 10 formed by the silicone polymer may be uncoated, or may be coated with, e.g., a rubber such as a urethane rubber, nitrile rubber or silicone rubber. The thickness of the layer of the semi-conductive silicone polymer layer 12 may be, e.g., between about 1.5 millimeters and about 12 inches. The shaft 11 can be made of steel, aluminum, a conductive plastic, pultrusion conductive rod, or any other material commonly used for the shaft 11 of a conductive roller 10.

Figure 2:
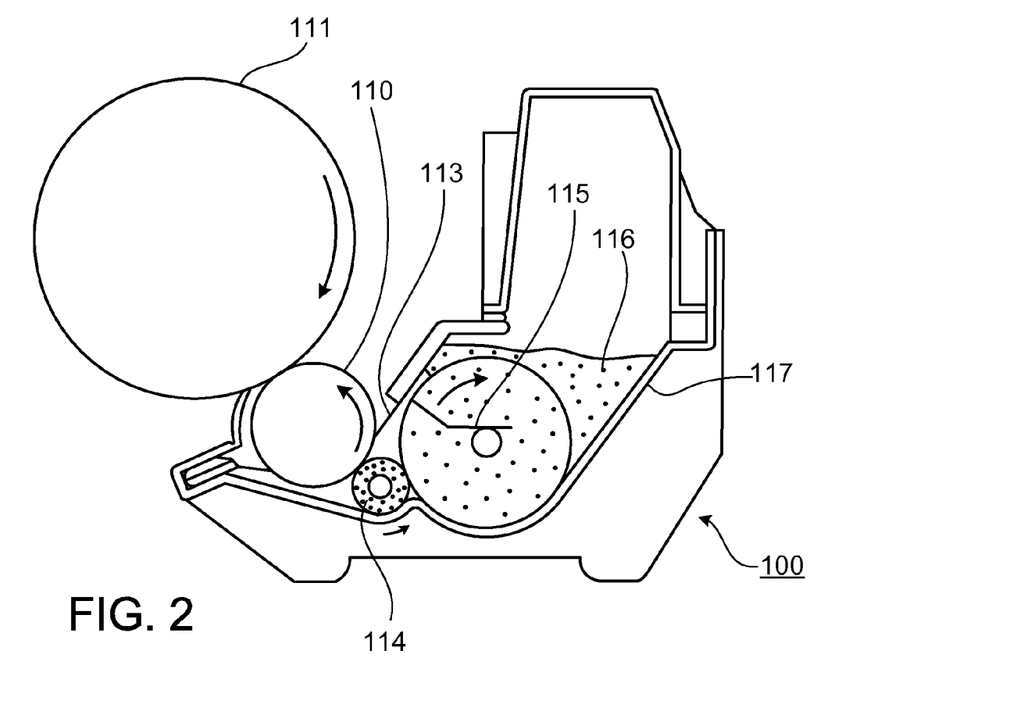
FIG. 2 shows a schematic cross-sectional illustration of a developing device including a conductive roller shown in FIG. 1.

FIG. 2 is a schematic cross-sectional illustration of a developing device 100 including a conductive roller 110 that is identical to the conductive roller 10 in FIG. 1. The developing device 100 is usable for an image forming. In FIG. 2, a non-magnetic single component toner 116, stored in toner tank 117, is conveyed and supplied onto toner add roller 114 as an auxiliary toner supply member, employing stirring blade 115 as the auxiliary toner supply member. Toner adhered on the sponge roller is conveyed to developing roller 110 via rotation in the arrowed direction of toner add roller 114, and is tribocharged with toner particles and electrical charge interaction with and on developing roller 110. The toner adhered onto developing roller 110 is subjected to uniformly thin-layering by rotation of developing roller 110, together with flexible blade 113 as a toner layer thickness regulating member, and is also subjected to a tribocharged environment between toner and developer roller 110. The thin layer of toner formed on developing roller 110 is supplied onto photoreceptor 111 as an image carrier via a contact or non-contact process to develop a latent image. In addition, the constitution of the developing unit 100 in which the developing roller 110 can be installed is not limited to one shown in FIG. 2.

Figure 3:
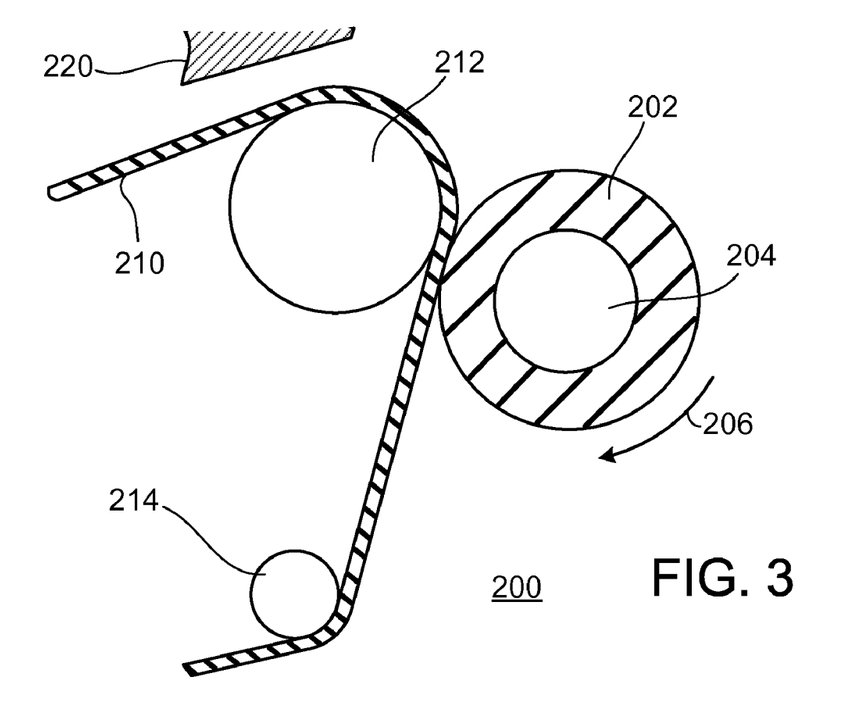
FIG. 3 shows a schematic cross-sectional illustration of a material conveyor including a belt and roller each containing a semi-conductive silicone polymer.

In another example, the article of manufacture is a material conveyor including a mount enabling relative motion of the conveyor with respect to adjacent structure; and an exposed conveyor surface connected to the mount and formed of a semi-conductive silicone composition including a silicone polymer and about $5.0 \times 10^{-4}\%$ to 5.0% by weight of an alkali metal salt and having a volume resistivity of E8 to E12 ohm-cm. In one example, the material conveyor can be, for example, a cylindrical roll 202 shown in FIG. 3, where the mount 204 is configured to enable rotation 206 of the roll 202 about a longitudinal axis, and where the exposed surface is a cylindrical outer surface of the roll 202. In another example, also shown in FIG. 3, the material conveyor can be in the form of an articulable or flexible solid or foam belt 210, wherein the mount comprises an engageable undersurface or drive lugs of the belt, and the exposed surface can include an outer surface of the belt 210. The belt 210 can be tensionably mounted in contact with secondary rollers 212 and 214 within a housing 220 to form an assembly 200.

Figure 4:
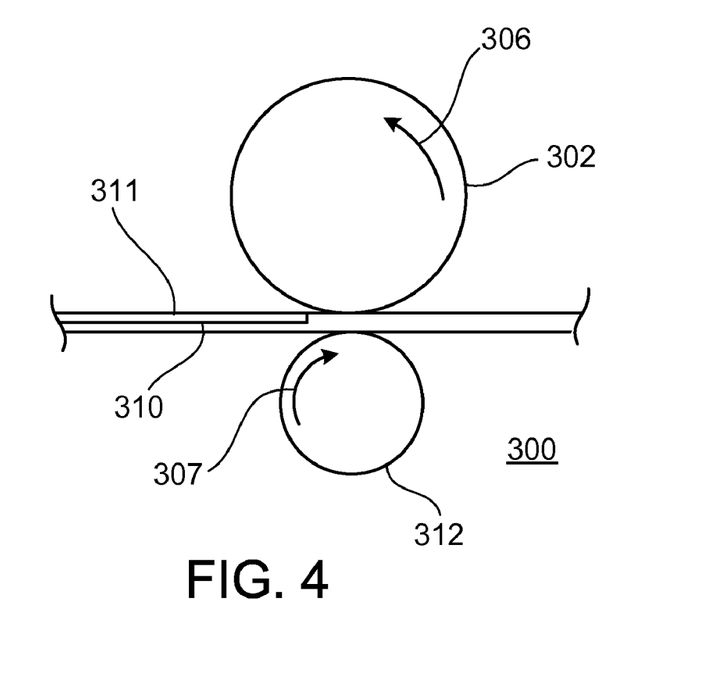
FIG. 4 shows a schematic cross-sectional illustration of a paper with toner positioned between a fuser roll containing a semi-conductive silicone polymer and a transport roll.

In yet another example, the article of manufacture can be a fuser roller 302 comprising a semi-conducting shown in FIG. 4 as part of a system 300 for heat setting toner 311 onto a sheet of paper 310. The fuser roller 302 is formed of a semi-conductive silicone composition including a silicone polymer and about $5.0 \times 10^{-4}\%$ to 5.0% by weight of an alkali metal salt and having a volume resistivity of E8 to E12 ohm-cm. In FIG. 4, paper 310 with toner deposited on a surface (e.g., after contact with an organic photoconductor drum) is translated between the fuser roller 302 by the combined motion 306, 307 of the fuser roller 302 and a transport roller 312, respectively. The fuser roller 302 is heated to a temperature suitable for fixing the toner on the paper 310 (e.g., about 200-300° F.). The paper 310 is heated by contact between the surface of the fuser roller 302 and the opposable surface of the rotating transport roller 312. The transport roller 312 can be made of a material suited to maintain contact with the paper 310 while translating the paper between the fuser roller 302 and the transport roller 312 (e.g., rubber or polyurethane). The system 300 can be configured to apply conditions (e.g., heat, pressure, and/or bias charge) to the paper 310 as it moves between the transport roller 312 and the fuser roller 302. The amount of pressure, heat and/or charge applied to the paper 310 in this manner can be selected to melt the toner 311 and adhere the toner 311 to the surface of the paper 310. The system 300 can be a portion of a system used to perform, for example, electrophotgraphic printing or x-ray fim imaging systems.

EXAMPLES

The invention is further described in the following examples, which do not limit the scope of the invention described in the claims. Methods of making, analyzing, and characterizing some aspects of the invention are described below.

Example 1

Preparation of 1-20% Alkaline Salts Solutions

In a 3000 ml container, 200 grams of Lithium perchlorate (anhydrous, purchased from Sigma-Aldrich, Milwaukee, Wis.) was slowly added in a 2000 gram of flame retardant, TBEP solution, at 220° F. under the mechanical stirring at a speed of 200-300 rpm. After 2 hours of the stirring, the alkaline salts were completely soluble in flame retardants existing in a molecular form. The concentrations of 10% of Lithium perchlorate in TBEP is labeled as Mearthane's CA701 while the 10% of lithium perchlorate in CEF is labeled as CA301.

Preparation of Semi-Conductive Silicone Composition

In a 300 mL container, 200 grams of Silastic J, RTV, rubber base, was poured into the container maintained at 90° F. temperature. It was then mixed with mechanical stirring at 300 rpm speed. A total of 20 grams of Silastic J, RTV, a curing agent, and 4 grams of conductive additive, CA-301, was added consequently into the 500 ml beaker during stirring. A metal shaft after applying adhesive or coating adhesive on metal shaft, with a Chemlok 607 adhesive from Lord Corp. (Erie, Pa.) was used as the adhesive to coat on steel to bond silicone. Stoner dry Teflon mold release was used for mold lease. The silicone mixture was then poured into the roller mold in pressure vessel for 20-30 minutes and demolded. After demolding, the silicone roller was placed at room temperature for 1-2 hrs. The roller was then placed in the oven at 325° F. for 1-2 hours to enhance the adhesive bonding between metal core and silicone. The roller was then left in room temperature for 2-12 hrs to complete the curing. The white roller has hardness of 51 shore A and volume resistivity of 9E11 ohm-cm.

Example 2

The same process as described Example 1 was adapted to a 1000 ml container. More specifically, 800 grams of Siastic T-2, RTV rubber base, 80 grams of Silastic T-2, RTV curing agent, and 2 grams of CA 701 and 2 grams of CA301, and 0.5 gram carbon black were added into the 1000 ml container. Both Silastic T-2, rubber base and Silastic T-2, curing agent, were heated at 90° F. and the mold temperature was controlled at room temperature (90° F.). The black roller has 40 Shore A, and volume resistivity is 6E11 ohm-cm.

Example 3-12

A similar process was followed as Example 1, except using the following different silicone precursors, curing agents and conductive additives. The compositions are shown in Table 1 below.

TABLE 1

Semi-Conductive Solid Silicone Roller Compositions (by weight)

| Components | Ex 3 | Ex 4 | Ex 5 | Ex 6 | Ex 7 | Ex 8 | Ex 9 | Ex 10 | Ex 11 | Ex 12 |
|---|---|---|---|---|---|---|---|---|---|---|
| EX1471, A | 100 | 100 | — | — | — | — | — | — | — | 50 |
| EX1471, B | 10 | 10 | — | — | — | — | — | — | — | 5 |
| Silastic J, A | — | — | 100 | — | — | — | — | — | — | — |
| Silastic J, B | — | — | 10 | — | — | — | — | — | — | — |
| Silastic T-2, A | — | — | — | 100 | — | — | — | — | — | 50 |
| Silastic T-2, B | — | — | — | 10 | — | — | — | — | — | 5 |
| Silastic E, A | — | — | — | — | 100 | 100 | 100 | — | — | — |
| Silane E, B | — | — | — | — | 10 | 10 | 10 | — | — | — |
| PC 898, A | — | — | — | — | — | — | — | 100 | — | — |
| PC 898, B | — | — | — | — | — | — | — | 10 | — | — |
| GE RTV615, A | — | — | — | — | — | — | — | — | 100 | — |
| GE RTV615, B | — | — | — | — | — | — | — | — | 10 | — |
| CA701 | 3 | 10 | — | 2 | 1 | 3 | — | 2 | 2 | 4 |
| CA301 | — | — | 4 | 2 | 2 | 3 | 3 | — | — | 4 |
| Hardness | 40A | 31A | 51A | 42A | 35A | 31A | 35A | 55A | 42A | 41A |
| Volume resistivity (ohm-cm) | 4E10 | 3E10 | 9E11 | 5E11 | 1E10 | 4E9 | 5E11 | 1E10 | 1E11 | 5E10 |

TABLE 2

Examples of Physical Properties of Solid Semi-conductive Silicone Polymers

| | EXP # | | | |
|---|---|---|---|---|
| | EXP 7 | EXP 4 | EXP 6 | EXP 5 |
| Hardness (Shore A) | 35 | 40 | 42 | 51A |
| Tensile (psi) | 750 | 470 | 800 | 850 |
| Elongation (%) | 350 | 190 | 300 | 250 |
| Tear Strength (pli) | 100 | 35 | 110 | 85 |
| Volume resistivity (ohm-cm) | 1E10 | 4E10 | 5E11 | 9E11 |
| COF (coefficient of friction) | 1.50 | 1.40 | 1.15 | 1.15 |

Example 13

The process described in Example 1 was performed, except using a 500 ml of stainless container. First, 200 grams of Silicone precursor, Nusil R2550 (obtained from NuSil Silicone Technology, Carpinteria) was added in 20 grams of conductive additive solution, CA701. The mixture was mechanically mixed for 30 min at temperature of 250 F at 300 rpm mixing speed for 10 minutes. The 1 gram of the catalyst, R2550 curing agent, was added into the mixture during mixing. It was then mixed for 5 minutes and left in the pressure vessel to minimize the voids or air bubble of the cure urethane slabs and rollers. After completely cured next day at 25 F for 12 hours, the hardness is 16 A with a volume resisitivity of 4E8 ohm-cm.

Example 14

100 grams of Silastic E, Part A (a rubber base), was added into a 500 ml stainless steel container A and then heated to 200° F. with a heat plate. Additional 5 gram of "OO", 3 grams of CA301, and 3 grams of CA701 were then poured into in the container. The mixture was stirred with mechanical mixer for 3 minutes at the speed of 300 rpm. In another 100 ml container B, 10 grams of Silastic E, Part B, a curing agent and 10 grams of methylene chloride were mixed with mechanical stirred at 300 rpm for 3 minutes.

The material in container B was then poured into container A under mechanical stirring at 300 rpm. This mixture was poured into the 1.3'×1.3'×0.5" cube mold to form the foam cube. The white cube was obtained which had the durometer of 13 A and foam density of 37.8 pcf. The volume resistivity of cube is 2.6E10 ohm-cm and Bashore rebound is 48%.

Example 15

Similar process as described in Example 10 except that 100 grams of Silastic E, Part A, rubber base, 5 grams of "OO", 4 grams of CA301 and 4 grams of CA-701 were heated to 110° F. before mixing with a mixture of Silastic E, Part B and 10 grams for BA7C, chemical foaming agent at 90° F. The material was poured into the cube mold heated up to 230-350° F. to form foam cube. The foam cubes has the durometer of 8 Shore A, foam density of 37.5 pcf, and Bashore rebound of 39%. The volume resistivity is 1E10 ohm-cm.

Examples 16-20

Semi-Conductive Silicone Foam Compositions

According to the procedure described in Example 15, the semi-conductive silicone polymers, listed in Table 2 below having various hardness and conductivity values were prepared. Listed in Table 3 are some physical properties of the silicone polymers.

TABLE 3

Conductive Silicone Foams (by weight)

|  | Ex. 16 | Ex. 17 | Ex. 18 | Ex. 19 | Ex. 20 |
| --- | --- | --- | --- | --- | --- |
| Silastic E, rubber base | 100 | 100 | 100 | — | — |
| Silastic E, curing agent | 10 | 10 | 10 | — | — |
| R2370 part A | — | — | — | 100 | 100 |
| R2370 part B | — | — | — | 6 | 6 |
| CA701 | — | — | — | 20 | 40 |
| "OO" | 5 | 5 | 5 | — | — |
| CA-701 | 3 | 3 | 6 | — | — |
| Carbon Black | 1 | 1 | 1 | — | — |
| CA301 | 3 | 3 | 3 | — | — |
| Methylene chloride | 10 | — | 5 | — | — |
| BA7C | — | 10 | 5 | — | — |
| Hardness | 13A | 8A | 17A | 5A | 7A |
| Volume resistivity | 2.6E10 | 1.8E10 | 8E9 | 3E9 | 1E9 |
| Foam Density | 37PCF | 38PCF | 39PCF | 40PCF | 45 PCF |

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

The disclosures of all patents, patent applications, and publications cited herein are hereby incorporated herein by reference in their entirety, to the extent that they provide exemplary, procedural, or other details supplementary to those set forth herein.

What is claimed is:

1. A method of manufacturing an article of manufacture with a semi-conductive silicone composition, the method comprising:
    a. combining an alkali metal salt with a solvent to dissolve the alkali metal salt in the solvent, wherein the solvent is selected from the group consisting of tributylethyl phosphate, tri(β-chloroethyl) phosphate, tri(β-chloropropyl) phosphate, and tributoxyethyl phosphate;
    b. combining the alkali metal salt as dissolved in the solvent with a reactive silicone precursor composition in a solution;
    c. polymerizing the reactive silicone precursor composition in the presence of the alkali metal salt to form a semi-conductive silicone composition; and
    d. forming the semi-conductive silicone composition into at least a portion of an article of manufacture, the semi-conductive silicone composition having a volume resistivity of E8 to E12 ohm-cm.

2. The method of claim 1, wherein polymerizing the reactive silicone precursor composition includes reacting a first silicone precursor and a second silicone precursor under conditions effective to chemically bind the first silicone precursor to the second silicone precursor via hydrosilylation or condensation polymerization.

3. The method of claim 1, wherein the semi-conductive silicone composition comprises a chemical complex of a molecule or ion of the alkali metal salt with one or more electron donating atoms.

4. The method of claim 2, wherein the semi-conductive silicone composition comprises a chemical complex of a molecule or ion of the alkali metal salt with one or more electron donating atoms.

5. The method of claim 1, wherein the alkali metal salt is present in the solvent at a concentration of 0.01% to 20% by weight.

6. The method of claim 1, wherein the alkali metal salt comprises an ionic form of an alkali metal selected from the group consisting of: lithium, sodium and potassium.

7. The method of claim 1, wherein the alkali metal salt as dissolved in the solvent is combined with the reactive silicone precursor composition in an amount of about $5.0 \times 10^{-4}$% to 5.0% by weight of the reactive silicone precursor composition.

8. The method of claim 2, further comprising
    a. combining the alkali metal salt as dissolved in the solvent with the first silicone precursor to form a first homogeneous mixture; and
    b. combining the first homogeneous mixture with the second silicone precursor under conditions effective to chemically bind the first silicone precursor to the second silicone precursor.

9. The method of claim 8, further comprising
    a. heating the first homogeneous mixture to about 90-250° F.;
    b. combining the second silicone precursor with a catalyst and a cross-linking agent to form a second mixture; and
    c. polymerizing the reactive silicone precursor composition in the second mixture to form a polymerized composition by combining the first homogenous mixture with the second mixture under conditions effective to chemically bind the first silicone precursor to the second silicone precursor.

10. The method of claim 9, further comprising
    a. pouring the polymerized composition into a mold;
    b. molding and curing the polymerized composition to form a molded composition;
    c. de-molding the molded composition; and
    d. curing the molded composition.

11. The method of claim 10, wherein the molded composition is a solid or foam composition in the form of a surface of a printer roller, an antistatic roller, a toner fuser roller, an offset printing relief roller for offset printing or an antistatic belt.

12. A method of manufacturing a semi-conductive silicone composition, the method comprising:
    a. dissolving an alkali metal salt in a solvent to form an alkali metal salt solution with about 0.01% to 20% by weight of the alkali metal salt, wherein the solvent is selected from the group consisting of tributylethyl phosphate, tri(β-chloroethyl) phosphate, tri(β-chloropropyl) phosphate, and tributoxyethyl phosphate;
    b. combining the alkali metal salt solution with a first reactive silicone precursor to form a precursor dispersion;
    c. combining the precursor dispersion with a second reactive silicone precursor to form a reactive silicone precursor composition; and
    d. polymerizing the first reactive silicone precursor and the second reactive silicone precursor in the reactive silicone precursor composition via condensation or hydrosilylation polymerization to chemically bind the first reactive silicone precursor to the second reactive silicone precursor, forming a polymerized silicone composition including a chemical complex of a molecule or ion of the alkali metal with one or more electron donating atoms; and
    e. forming the polymerized silicone composition into a solid semi-conductive silicone component having a volume resistivity of E8 to E12 ohm-cm.

13. The method of claim 12, wherein the alkali metal salt solution is combined with the first reactive silicone precursor to provide a precursor dispersion containing about $5.0 \times 10^{-4}\%$ to 5.0% by weight of the alkali metal salt.

14. The method of claim 12, wherein the alkali metal is lithium, and further comprising:
a. heating the precursor dispersion to about 90° F.-250° F.;
b. combining the second reactive silicone precursor with a catalyst and a cross-linking agent in the reactive silicone precursor composition;
c. pouring the polymerized silicone composition into a mold;
d. molding the polymerized silicone composition to form a molded silicone composition;
e. de-molding the molded silicone composition; and
f. curing the molded silicone composition to form a print roller or portion thereof at about 25-400° F.

* * * * *